United States Patent [19]

Yamamoto

[11] Patent Number: 4,553,303

[45] Date of Patent: Nov. 19, 1985

[54] REMOVAL TOOL FOR TANGLESS, HELICALLY COILED INSERT

[75] Inventor: Albert K. Yamamoto, Huntington Beach, Calif.

[73] Assignee: Rexnord Inc., Brookfield, Wis.

[21] Appl. No.: 581,838

[22] Filed: Feb. 21, 1984

[51] Int. Cl.[4] .............................................. B23P 19/04

[52] U.S. Cl. ..................................... 29/240.5; 81/443; 81/450

[58] Field of Search ................. 29/240.5; 81/440–445, 81/450

[56] References Cited

U.S. PATENT DOCUMENTS

| | | | |
|---|---|---|---|
| 1,277,624 | 9/1918 | Matula | 81/444 |
| 1,627,301 | 5/1927 | Wood | 81/443 |
| 1,676,775 | 7/1928 | Doherty | 81/443 |
| 2,227,466 | 1/1941 | Runge | 81/444 |
| 2,408,887 | 10/1946 | Schriner | 81/443 |
| 3,579,793 | 5/1971 | Williams | 29/240.5 |

*Primary Examiner*—James L. Jones, Jr.

[57] ABSTRACT

A removal tool for a tangless helically coiled wire insert of the type used for tapped holes in parent material that is generally softer than a fastener being screwed into the tapped hole, whereby a mandrel having a threaded lead portion and a pivotable pawl inserted in a groove below the threaded portion so that the pawl engages a recess of the trailing end of the insert, in order that the insert may be extracted from the tapped hole. The pivotable pawl is automatically disengaged from the insert when the mandrel is pulled back, allowing the mandrel to free spin out of the tangless insert.

3 Claims, 6 Drawing Figures

REMOVAL TOOL FOR TANGLESS, HELICALLY COILED INSERT

BACKGROUND OF THE INVENTION

This invention relates to a tool for removing wire coil screw thread inserts and, more particularly, to an improved extraction tool for tangless wire coil inserts.

Tools for the removal of wire coil inserts are well known. Generally, these tools have a tapered blade with a pair of knife edges which are driven into the inner diameter threads of the insert. However, when using these tools to extract an insert, the insert is permanently damaged. Further, to insure proper performance of these tools the blade must be placed into the hole so that one side of the blade is ¼ turn from the trailing end of the insert. If the blade is placed in the hole other than ¼ turn from the end of the insert, it will cause the end of the insert to dig into the parent material, thus damaging the threads in the tapped hole. In addition, the insert will back out with extreme difficulty. Still further, if the insert has been installed too deep, it is necessary to alter the taper of the tool blade so that it will not bite into the threads, countersink, or counterbore of the parent material.

Thus, there exists a need for an extraction tool for tangless wire coil inserts that solves the problems of the prior tools.

SUMMARY OF THE INVENTION

The present invention is directed to a tool for extracting tangless helically coiled inserts in tapped holes and comprises a sleeve member having a rotatable and axially movable mandrel, threaded at one, insertable therein, so that the threaded end mates with the inner threads of the insert, and a pivotal pawl located in a cutout near the threaded end portion of the mandrel for engagement with a notch near the inner diameter of the trailing end of the insert, for removing the insert. Clockwise rotation of the mandrel causes an inwardly pivotal movement of the pawl upon contact with the trailing end of the insert, until a hook portion of the pawl is engaged in the notch of the trailing end of the insert. When the hook is engaged in the notch of the insert, counter clockwise rotation of the mandrel will extract the insert from the hole.

When the insert is removed, axially pulling the mandrel will cause a camming action against an inner ramp of the sleeve member, thus pivoting the pawl inwardly and releasing the hook from the notch in the insert.

It is an object of the present invention to provide an extraction tool which is simple to use and does not require a specific orientation of the tool with respect to the end of the insert.

A further object of the present invention is to provide an extraction tool that will not damage the threads of either the insert or the parent material when removing an insert.

A still further object of the present invention is to provide a tool that allows reuse of the insert after it has been removed.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferrred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

The present invention is particularly adapted for use with helically coiled tangless inserts which are used, for example, where a steel spark plug having conventional threads is desired to be fastened into a material of relatively softer alloy, such as aluminum.

Figures 1, 4, 5, 6:
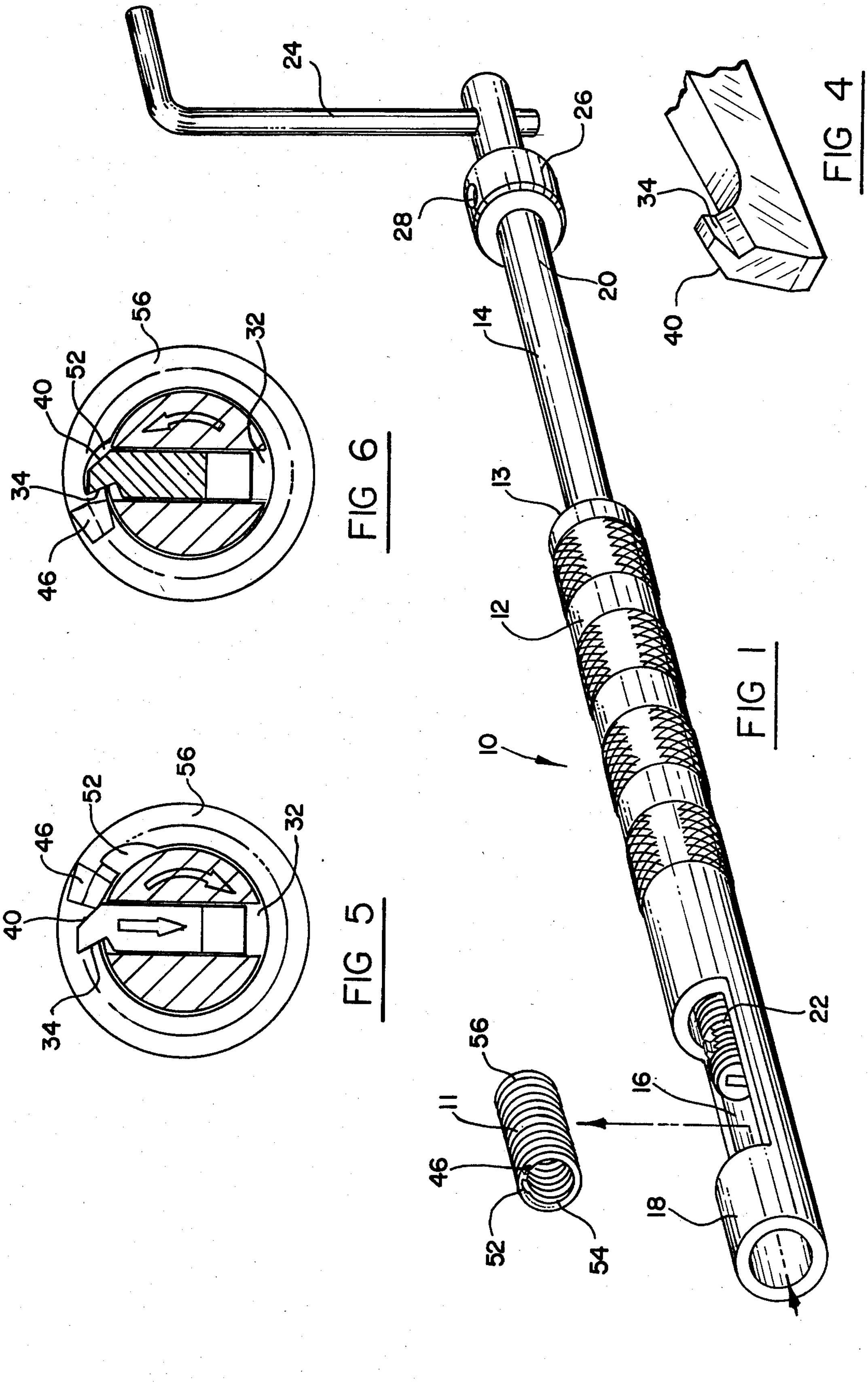
FIG. 1 is a perspective view of a tangless helically coiled insert extraction tool in accordance with the present invention.
FIG. 4 is a perspective view of the pawl of the present invention.
FIG. 5 is a sectional view, with some details omitted, showing the installation of the tool of the present invention as it is rotated and approaches the trailing end of an installed insert.
FIG. 6 is a sectional view, with some detail omitted, taken along lines 6—6 of FIG. 2.

As illustrated in FIG. 1, the extraction tool 10 of the present invention is comprised of two major portions: a tubular body member 12, and a mandrel assembly 14 insertable into the tubular body and adapted to receive a tangless insert 11 which is to be removed from a tapped hole. The tubular body member 12 provides, in part, the operator with a means for supporting the mandrel assembly 14 in order to remove the insert correctly during operation. The tubular body member 12 may include an unloading window 16, for supporting an insert after removal, and a coil alignment portion 18 which keeps the insert on the mandrel assembly 14 during removal.

Figure 2:
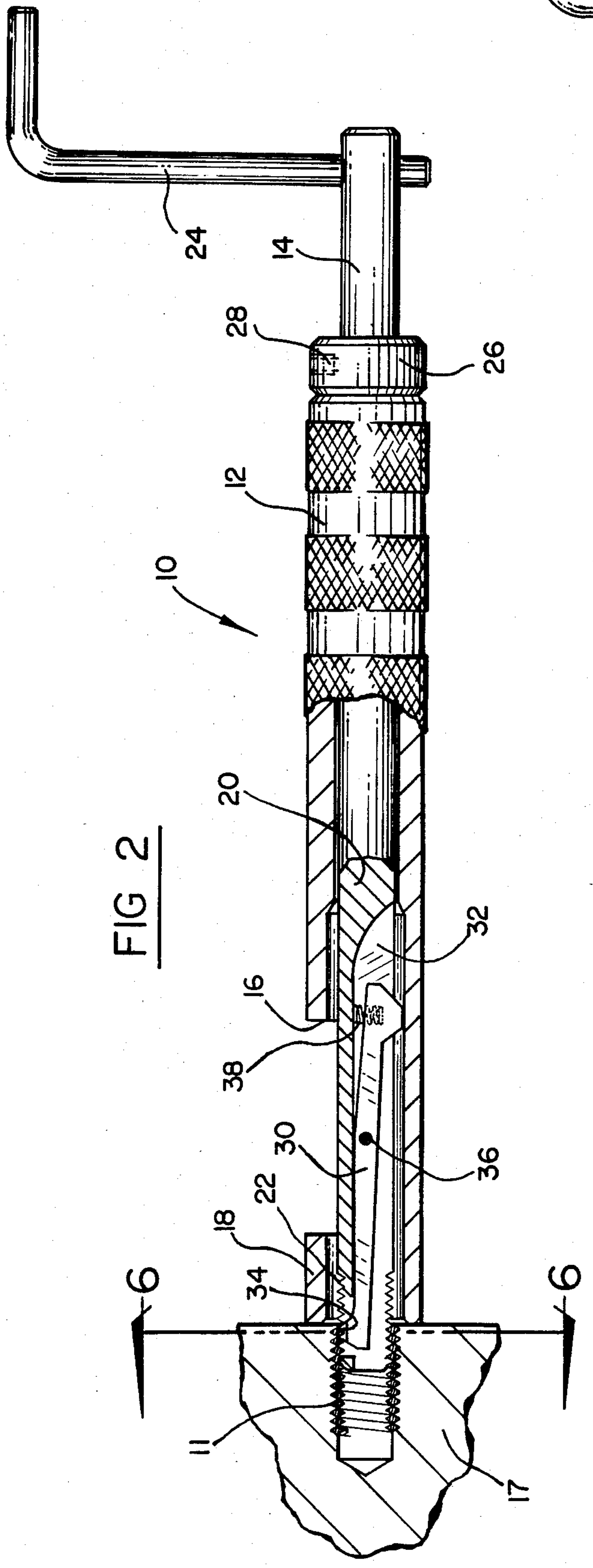
FIG. 2 is a side elevation of the tool of the present invention showing the position of the parts prior to extraction of the insert.
Figure 3:
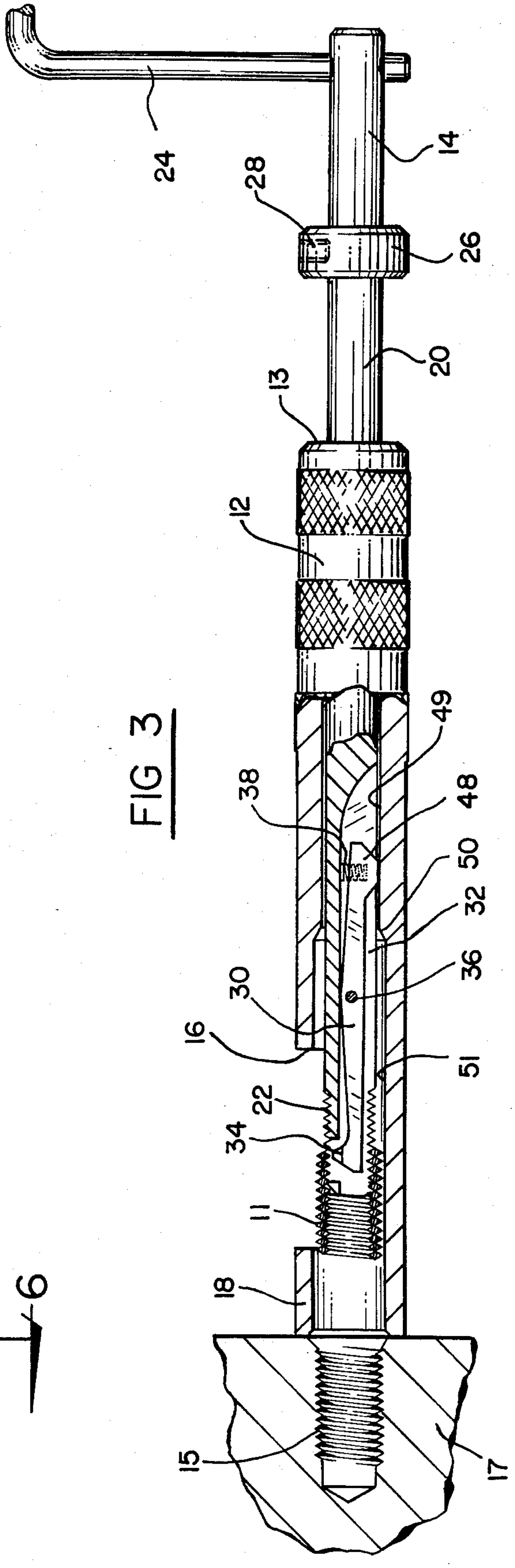
FIG. 3 is a side elevation of the tool of the present invention showing the position of the parts after extraction of the insert from the tapped hole.

The mandrel assembly 14, as shown in FIGS. 2–3, is insertable into the tubular body member 12 and is adapted to remove the tangless insert from a tapped hole. The mandrel assembly 14 comprises a cylindrical rod 20 of a diameter substantially equal to the inner diameter of the tubular body member 12. The lead end 22 of the rod 20 is threaded and has a diameter generally according to the inner diameter that insert 11 has when it is in its contracted state and installed in the tapped hole 15 of the parent material 17. Thus, the diameter of lead end 22 is somewhat smaller than the inner coil diameter of insert 11 after it is removed and is in its free state. At the end opposite the lead end there is generally a crank handle 24 for applying torque for removing the insert from the tapped hole 15. The crank handle 24 may be replaced at the driver end of the cylindrical rod 20 with a shaped portion, to which a wrench may be applied.

Further, as illustrated in FIGS. 1–3, an adjustable stop collar 26 serves as an abutment with the end portion 13 of tubular body member 12, thereby presetting the distance that the lead end 22 of the rod 20 may project out of the coil alignment portion 18 of the tubular body member 12, thus defining the proper depth to which the rod 20 may extend to contact an installed insert at a predetermined depth. A set screw 28 is provided in the adjustable stop collar 26 to secure the stop in its proper position.

In FIGS. 2–3 a pivotable catch or pawl 30, constructed in accordance with the invention, is illustrated in an elevation sectional view within a longitudinal cutout 32 of mandrel assembly 14. The pawl 30 is biased within the cutout 32 so that a hook portion 34 engages the recess 52 of the tangless wire coil insert 11. The pawl is generally biased about pivot point 36 by spring 38 to locate the hook portion 34 into the recess 52 of the insert when the threaded lead portion 22 of rod 20 is screwed into the previously installed insert 11.

As shown in FIG. 4, the hook portion 34 has a ramp 40 adjacent to it, but on the opposite side of the longitudinal centerline of the pawl 30, to bias the pawl 30 inwardly in the direction of the arrow of FIG. 5, when the ramp 40 contacts the truncated end portion 46 of the trailing end coil 56 of an installed insert 11. Accordingly, the important feature of the pivotable pawl 30 is that it has the ability to locate the hook portion 34 in the recess of the trailing end coil of the insert 11 to remove the insert 11 from the tapped hole when counterclockwise force is applied to the rod 14 as shown in FIG. 6. Futher, as shown in FIG. 3, after the insert 11 has been removed from the tapped hole and the lead end 54 of the insert is within the tubular body member 12, the pivotable pawl 30 can be automatically disengaged from the recess 52 of the insert by axially pulling the mandrel assembly 14 rearward. When the mandrel assembly 14 is pulled back, the cam means 48 moves from the larger inner diameter portion 51 along ramp 50 to the smaller inner diameter portion 49, thus allowing the mandrel assembly 14 to free spin out of the insert 11.

What is claimed is:

1. An extraction tool for removing an installed tangless, helically coiled insert having a recess in the inner thread of the first coil at each end, from a tapped hole, said tool comprising:

a tubular body of substantially circular cross-section having a longitudinal bore therethrough;

a mandrel insertable in said tubular body and constructed and arranged to move axially and rotatably in said bore, said mandrel having driving means at one end for moving said mandrel axially and rotatably, a threaded portion at an end opposite said driving means, and a longitudinal cutout at said opposite end; and a pivotable pawl arranged in said longitudinal cutout, said pivotable pawl having a laterally projecting hook means adjacent said opposite end of said mandrel for engaging a recess at the trailing end of the insert, said insert recess engaging means being located on the counterclockwise side of the longitudinal centerline of said pivotable pawl, and ramp means, adjacent said recess engaging means and on the clockwise side of the longitudinal centerline of said pivotable pawl, for pivoting the lead end of said pivotable pawl inwardly upon contact with the trailing end of the insert, said mandrel further including means for biasing said pawl in a first upward direction, with said biasing means and said pawl being constructed and arranged such that said recess engaging means automatically engages the insert recess when said pawl is inserted into the insert by rotation of said mandrel.

2. An extraction tool as claimed in claim 1, further including a threadless coil alignment means at one end of said tubular body for keeping said hook means of said pivotable pawl in engagement with the notch at the trailing end of the insert when removing the insert.

3. An extraction tool as claimed in claim 1 further including means for releasing said pawl from engagement with an extracted insert, said means including said pawl having an end opposite said pawl hook means with an angled surface thereon, and said tubular body longitudinal bore having a forward portion with a first inner diameter, a rearward portion with a second inner diameter less than said first inner diameter, and a ramp portion connecting said forward and rearward portions, whereby a force moving said mandrel rearwardly in said body causes said pawl angled surface to travel along said forward portion and said ramp portion to said rearward portion, thereby pivoting said pawl recess engaging means in a manner which automatically releases an insert from engagement therewith.

* * * * *